(12) United States Patent
Okabe et al.

(10) Patent No.: US 7,605,211 B2
(45) Date of Patent: Oct. 20, 2009

(54) IONOMER COMPOSITION FOR GOLF BALL, PRODUCTION METHOD THEREOF AND GOLF BALL USING THE SAME

(75) Inventors: Satoko Okabe, Kobe (JP); Takashi Sasaki, Kobe (JP); Toshiyuki Tarao, Kobe (JP)

(73) Assignee: SRI Sports Limited, Kobe-shi (JP)

( * ) Notice: Subject to any disclaimer, the term of this patent is extended or adjusted under 35 U.S.C. 154(b) by 296 days.

(21) Appl. No.: 11/651,036

(22) Filed: Jan. 9, 2007

(65) Prior Publication Data

US 2007/0161750 A1 Jul. 12, 2007

(30) Foreign Application Priority Data

Jan. 10, 2006 (JP) ............... 2006-002923

(51) Int. Cl.
*A63B 37/00* (2006.01)
*A63B 37/12* (2006.01)
*C08G 18/62* (2006.01)
*C08G 63/16* (2006.01)
*C08F 220/06* (2006.01)

(52) U.S. Cl. ............ 525/123; 525/187; 525/330.1; 525/330.2; 525/384; 526/219; 526/318.45; 526/318.6; 473/372; 473/373; 473/385

(58) Field of Classification Search .......... None
See application file for complete search history.

(56) References Cited

U.S. PATENT DOCUMENTS

| | | | |
|---|---|---|---|
| 4,884,814 A | 12/1989 | Sullivan | |
| 5,565,524 A | 10/1996 | Hamada et al. | |
| 5,869,578 A | 2/1999 | Rajagopalan | |
| 6,930,164 B1 | 8/2005 | Brunelle et al. | |
| 2003/0204022 A1 * | 10/2003 | Kennedy et al. | 525/242 |
| 2003/0224873 A1 * | 12/2003 | Ichikawa et al. | 473/371 |
| 2005/0004325 A1 * | 1/2005 | Wu et al. | 525/462 |
| 2005/0038190 A1 * | 2/2005 | Kuntimaddi | 525/123 |
| 2007/0161751 A1 * | 7/2007 | Sasaki et al. | 525/192 |
| 2007/0161752 A1 * | 7/2007 | Tarao et al. | 525/192 |

FOREIGN PATENT DOCUMENTS

| | | |
|---|---|---|
| GB | 2 264 302 A | 8/1993 |
| JP | 1-308577 A | 12/1989 |
| JP | 5-277208 A | 10/1993 |
| JP | 7-132152 A | 5/1995 |
| JP | 8-182777 A | 7/1996 |
| JP | 11-500776 A | 1/1999 |
| JP | 2001-515529 A | 9/2001 |
| WO | WO-98/36003 A1 | 8/1998 |

OTHER PUBLICATIONS

Office Action issued Jun. 18, 2009 for U.S. Appl. No. 11/651,098.

* cited by examiner

*Primary Examiner*—David Buttner
(74) *Attorney, Agent, or Firm*—Birch, Stewart, Kolasch & Birch, LLP

(57) ABSTRACT

The present invention provides a golf ball with excellent abrasion-resistance, durability and resilience having an ionomer resin cover therein. The ionomer composition for the golf ball of the invention comprises a reaction product obtained by reacting a telechelic copolymer having functional groups introduced in both terminals of a binary copolymer formed by copolymerizing an olefin monomer having 2 to 8 carbon atoms and an unsaturated carboxylic acid having 2 to 18 carbon atoms, and/or a ternary copolymer formed by copolymerizing an olefin monomer having 2 to 8 carbon atoms, an unsaturated carboxylic acid having 2 to 18 carbon atoms and an unsaturated carboxylic acid ester with a hydroxyl group-containing compound or an isocyanate group-containing compound, wherein at least 10 mole % of a carboxylic group in said reaction product is neutralized with an inorganic metal.

19 Claims, No Drawings

IONOMER COMPOSITION FOR GOLF BALL, PRODUCTION METHOD THEREOF AND GOLF BALL USING THE SAME

BACKGROUND OF THE INVENTION

1. Field of the Invention

The present invention relates to a novel ionomer composition for a golf ball, which can be preferably used for producing the golf ball, a production method thereof, and a golf ball using the composition.

2. Description of the Related Art

A wound-core golf ball having a balata cover, a two-piece or three-piece golf ball having an ionomer cover, and the like are known as a conventional golf ball. A wound-core golf ball having a balata cover has good shot feeling and controllability, but is expensive due to the complicate production steps, and also has problems such as poor durability and abrasion-resistance. A golf ball having an ionomer cover is excellent in resilience, abrasion-resistance and molding ability due to the relative hardness thereof, but has problems such as poor shot feeling and controllability.

Therefore, the improvements of the shot feeling and the controllability of the ionomer cover have been proposed, for example, in Japanese Unexamined Patent Publication Nos. H01-308577, H05-277208, H07-132152, H08-182777, H11-500776, and 2001-515529. For example, Japanese Unexamined Patent Publication No. H01-308577 discloses a technique of blending a hard ionomer and a soft ionomer. Japanese Unexamined Patent Publication No. H05-277208 discloses a technique of using 2 or more kinds of ionomer resins having a relatively low modulus. Japanese Unexamined Patent Publication No. H07-132152 discloses that a heated mixture of an ionomer resin, a terpolymer consisting of α-olefin, an unsaturated carboxylate and an unsaturated carboxylic acid, and a glycidyl group-containing α-olefin copolymer resin is used as a base resin of the cover. Japanese Unexamined Patent Publication No. H08-182777 discloses that a heated mixture of three kinds comprising an ionomer resin, a maleic anhydride-modified olefin copolymer and a glycidyl group-modified styrene-based block copolymer having JIS-A hardness of from 30-90 is used as a base resin of the cover. Japanese Unexamined Patent Publication No. H11-500776 discloses a production method of a composition for the golf ball cover, comprising saponify a polymer with an inorganic metal base to produce a polymer salt with saponification degree of about 1 to 50%, wherein the polymer comprises a first monomer component containing an olefin monomer having 2 to 8 carbon atoms, a second monomer component containing an acrylate ester having 4 to 22 carbon atoms based on an unsaturated carboxylic acid, and an optional third monomer component containing at least one monomer selected from the group consisting of carbon monoxide, sulfur dioxide, an unsaturated monocarboxylic acid, an olefin having 2 to 8 carbon atoms and a vinyl ester or a vinyl ether of an alkyl acid having 4 to 21 carbon atoms. Japanese Unexamined Patent Publication No. 2001-515529 discloses an acid copolymer such as ethylene-methacrylic acid or a composition including an ionomer and an adipic acid component.

SUMMARY OF THE INVENTION

According to the improving techniques described above, although the shot feeling of the ionomer covers is somewhat improved, the abrasion-resistance and the resilience tend to be lowered. Thus, there is a desire for achieving a golf ball having a higher level of the resilience, the abrasion-resistance and the shot feeling which are well balanced.

The present invention has been achieved in view of the above problems and provides an ionomer composition for a golf ball, comprising a reaction product obtained by reacting a telechelic copolymer having functional groups introduced in both terminals of a binary copolymer formed by copolymerizing an olefin monomer having 2 to 8 carbon atoms and an unsaturated carboxylic acid having 2 to 18 carbon atoms, and/or a ternary copolymer formed by copolymerizing an olefin monomer having 2 to 8 carbon atoms, an unsaturated carboxylic acid having 2 to 18 carbon atoms and an unsaturated carboxylic acid ester with a hydroxyl group-containing compound or an isocyanate group-containing compound, wherein at least 10 mole % of a carboxylic group in said reaction product is neutralized with an inorganic metal.

Also, the present invention provides a production method of an ionomer composition for a golf ball, comprising the steps of:

obtaining a reaction product by reacting a telechelic copolymer having functional groups introduced in both terminals of a binary copolymer formed by copolymerizing an olefin monomer having 2 to 8 carbon atoms and an unsaturated carboxylic acid having 2 to 18 carbon atoms, and/or a ternary copolymer formed by copolymerizing an olefin monomer having 2 to 8 carbon atoms, an unsaturated carboxylic acid having 2 to 18 carbon atoms and an unsaturated carboxylic acid ester with a hydroxyl group-containing compound or an isocyanate group-containing compound; and neutralizing the carboxylic group of said telechelic copolymer or the resultant reaction product with an inorganic metal compound.

Namely, a gist of the present invention resides in the use of the reaction product obtained by reacting the telechelic copolymer having functional groups introduced in both the terminals thereof with a hydroxyl group-containing compound or an isocyanate group-containing compound, wherein at least 10 mole % of a carboxylic group in said reaction product is neutralized with an inorganic metal as an ionomer used for the golf ball. Use of the above reaction products improves resilient performance and abrasion-resistance while being soft.

According to the present invention, a golf ball well balanced in resilience, abrasion-resistance and good shot feeling can be obtained.

DESCRIPTION OF THE PREFERRED EMBODIMENTS (1) An Ionomer Composition for the Golf Ball of the Present Invention The ionomer composition for the golf ball of the present invention comprises a reaction product obtained by reacting a telechelic copolymer having a functional group introduced in both terminals of a binary copolymer formed by copolymerizing an olefin monomer having 2 to 8 carbon atoms and an unsaturated carboxylic acid having 2 to 18 carbon atoms, and/or a ternary copolymer formed by copolymerizing an olefin monomer having 2 to 8 carbon atoms, an unsaturated carboxylic acid having 2 to 18 carbon atoms and an unsaturated carboxylic acid ester with a hydroxyl group-containing compound or an isocyanate group-containing compound, wherein at least 10% or more of a carboxylic group in said reaction product is neutralized with an inorganic metal.

First, the telechelic copolymer having a functional group introduced in both terminals of the binary copolymer formed by copolymerizing an olefin monomer having 2 to 8 carbon atoms and an unsaturated carboxylic acid having 2 to 18 carbon atoms, and/or a ternary copolymer formed by copolymerizing an olefin monomer having 2 to 8 carbon atoms, an unsaturated carboxylic acid having 2 to 18 carbon atoms and an unsaturated carboxylic acid ester will be explained.

The above olefin monomer having 2 to 8 carbon atoms is an aliphatic unsaturated hydrocarbon having one double bond in a molecule, including for example, ethylene, propylene, butene, pentene, hexene, heptene and octene. Among them, ethylene and propylene are preferable, and ethylene is more preferable. The olefin monomers can be used alone or as a mixture of two or more of them.

The above unsaturated carboxylic acid having 2 to 18 carbon atoms is a compound having 2 to 18 carbon atoms and containing at least one ethylenically unsaturated double bond and a carboxylic group in a molecule, more preferably an $\alpha,\beta$-unsaturated carboxylic acid having 3 to 8 carbon atoms. Examples of the unsaturated carboxylic acid having 2 to 18 carbon atoms include acrylic acid, methacrylic acid, fumaric acid, maleic acid, crotonic acid (trans-2-butenoic acid), isocrotonic acid (cis-2-butenoic acid), sorbic acid, citraconic acid and mesaconic acid; in particular, acrylic acid and methacrylic acid are preferable.

Examples of the above unsaturated carboxylic acid ester include a methyl, an ethyl, a propyl, a n-butyl or an isobutyl ester of acrylic acid, methacrylic acid, fumaric acid, maleic acid, crotonic acid (trans-2-butenoic acid), isocrotonic acid (cis-2-butenoic acid), sorbic acid, citraconic acid and mesaconic acid; in particular, the ester of the acrylic acid or a methacrylic acid is preferable.

As the above binary copolymer, particularly preferred is a binary copolymer obtained by copolymerizing ethylene and (meth)acrylic acid, and as the ternary copolymer, particularly preferred is a ternary copolymer obtained by copolymerizing ethylene, (meth)acrylic acid and (meth)acrylic acid ester.

The content of the olefin monomer in the above binary and ternary copolymer is 1% by mass or more, more preferably 5% by mass or more, further preferably 10% by mass or more, further more preferably 50% by mass or more, and 99% by mass or less, preferably 95% by mass or less, further preferably 80% by mass or less. When the content of the olefin monomer is outside of the above range, the resilience of the resultant ionomer composition may become insufficient.

The ternary copolymer preferably contains the unsaturated carboxylic acid in an amount of 1 mass % or more, more preferably 5 mass % or more, even more preferably 8 mass % or more, and preferably contains the unsaturated monomer having the acid functional group in an amount of 50 mass % or less, more preferably 40 mass % or less, even more preferably 30 mass % or less. If the content of the unsaturated carboxylic acid is outside the above range, the impact resilience of the obtained ionomer composition may become insufficient.

The present invention uses the telechelic copolymer having a functional group introduced in both terminals of the binary copolymer and/or the ternary copolymer. Herein, "both terminals" mean the both terminals of a main chain of the telechelic copolymer, and the functional groups introduced in both terminals are not derived from the unsaturated carboxylic acid, but are ones introduced into both terminals of the copolymer by an another method that will be described later.

Examples of the functional groups introduced in terminals include a carboxyl group, a hydroxyl group, an amino group, an isocyanate group, halogen, a nitro group, a thiol group and an epoxy group. Preferable is a hydroxyl group, an amino group or an isocyanate group. Also, functional groups in both terminals of the binary copolymer and ternary copolymer may be different or the same, but preferably is the same.

As the production method of the telechelic copolymer used in the present invention, a well known method can be employed. For example, the telechelic copolymer can be synthesized using a radical initiator as a polymerization catalyst under the conditions of reaction pressure of about 100 to 300 KPa and reaction temperature from 150° C. to 350° C. in a tank reactor equipped with a stirring machine in the same manner as in the production of a high pressure polyethylene. When an initiator or a chain transfer agent capable of introducing a functional group is used, a functional group can be introduced in both terminals of the copolymer obtained.

Examples of an initiator capable of introducing a hydroxyl group include hydrogen peroxide, 2,2'-azobis{2-[1-(2-hydroxyethyl)-2-imidazoline-2-yl]propane}dihydrochloride (VA-60 available from Wako Pure Chemical Industries, Ltd.), 2,2'-azobis[2-methyl-N-(2-hydroxyethyl)propionamide] (VA-086 available from Wako Pure Chemical Industries, Ltd.), and 2,2'-azobis{2-methyl-N-[1,1-bis (hydroxymethyl)-2-hydroxyethyl]propionamide} (VA-080 available from Wako Pure Chemical Industries, Ltd.); examples of an initiator capable of introducing a carboxyl group include 2,2'-azobis[N-(2-carboxyethyl)-2-methylpropionamidine] hydrate (VA-057 available from Wako Pure Chemical Industries, Ltd.); examples of an initiator capable of introducing an amino group include 2,2'-azobis(2-methylpropionamidine) dihydrochloride (V-50 available from Wako Pure Chemical Industries, Ltd.). Also, using an initiator capable of introducing an allyl group, 2,2'-azobis [N-(2-propenyl)-2-methylpropionamide] (VF-096 available from Wako Pure Chemical Industries, Ltd.), it may be modified into a desired functional group such as an epoxy group by introducing an allyl group followed by conducting an addition reaction or an oxidation reaction. Further, an alkoxyamine type initiator having various functional groups can be listed.

As a chain transfer agent capable of introducing a functional group include, examples of the chain transfer agent capable of introducing halogen, include carbon tetrachloride and carbon tetrabromide. Preferably, once halogen is introduced, and then halogen is replaced with a nitro group, a thiol group, an amino group, a hydroxyl group or the like. Examples of a chain transfer agent capable of introducing a hydroxyl group include mercaptoethanol. Also, a functional group X can be introduced in the terminals by using an addition splitting type chain transfer agent having a structure of $CH_2=C(CH_2X)Y$, where $X=Br$ or $SO_2Ar$. When the same functional group is introduced into both terminals of the binary copolymer and/or the ternary copolymer, it is preferable to adopt one capable of introducing the same functional group as the initiator and the chain transfer agent.

Also, a method of introducing an isocyanate group at the terminals may include, for example, a method wherein a hydroxyl group or an amino group is once introduced at the terminals of the copolymer followed by being reacted with a polyisocyanate, or a method wherein an amino group is once introduced followed by being reacted with phosgene to be modified into an isocyanate group.

The polyisocyanate may include, for example, an aromatic polyisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), paraphenylene diisocyanate (PPDI); and an alicyclic polyisocyanate or an aliphatic polyisocyanate such as 4,4'-dicyclohexylmethane diisocyanate ($H_{12}MDI$), hydrogenated xylene diisocyanate ($H_6XDI$), hexamethylene diisocyanate (HDI), isophorone diisocyanate (IPDI) and norbornene diisocyanate (NBDI). The above polyisocyanate may be used alone or as a mixture of two or more thereof.

The hydroxyl group-containing compound used in the present invention is not particularly limited as long as it has a hydroxyl group. Examples of the hydroxyl group-containing compound are a monool containing one hydroxyl group and a polyol containing at least two hydroxyl groups.

The above monool may include, for example, an aliphatic alcohol having 1 to 20 carbon atoms such as methanol, ethanol, n-propanol, isopropanol, butanol, pentanol, hexanol, dodecyl alcohol and stearyl alcohol; phenol or a derivative thereof such as phenol, o-cresol, m-cresol, p-cresol (hereinafter, ortho, meta and para isomers are sometimes simply denoted as o-, m-, and p-, respectively), dimetylphenol, o, m, p-ethylphenol, o, m, p-n-propylphenol, o, m, p-isopropylphenol, o, m, p-phenylphenol, o, m, p-benzylphenol and cumylphenol; and an aralkyl alcohol having 7 to 20 carbon atoms such as benzyl alcohol and phenethyl alcohol.

Examples of the above polyol include an aliphatic polyol, an aromatic polyol and a polymer polyol.

Examples of the above aliphatic polyol include an aliphatic diol such as ethylene glycol, 1,3-propanediol, 1,2-propanediol, 1,3-butanediol, 2-methyl-propanediol, 1,4-butanediol, neopentyl glycol, pentamethylene glycol, hexamethylene glycol, octamethylene glycol, decamethylene glycol, dodecamethylene glycol, 1,4-cyclohexane dimethanol, diethylene glycol, dipropylene glycol, triethylene glycol, tetraethylene glycol and pentaethylene glycol; and an aliphatic triol such as glycerin, trimethylolpropane and hexanetriol.

Examples of the above aromatic polyol include biphenyl or a derivative thereof such as 2,2'-dihydroxybiphenyl and 4,4'-dihydroxybiphenyl; a bis(hydroxyaryl)alkane (alkane having 1 to 6 carbon atoms) such as bis(hydroxyphenyl)methane, bis(hydroxyphenyl)ethane and bis(hydroxyphenyl)propane; a bis (alkyl-substituted hydroxyphenyl)alkane such as bis(3-methyl-4-hydroxyphenyl)methane, bis (3-methyl-4-hydroxyphenyl)ethane, bis (3,5-dimethyl-4-hydroxyphenyl) methane and bis (3,5-dimethyl-4-hydroxyphenyl)ethane; a bis(hydroxyaryl)cycloalkane (cycloalkane having 3 to 12 carbon atoms) such as bis(hydroxyphenyl)cyclohexane; a bis (hydroxyaryl)carboxylic acid (carboxylic acid having 2 to 6 carbon atoms) such as bis-4,4'-(hydroxyphenyl)butanoic acid; a terpenediphenol such as 1,4-di(alkyl-substituted hydroxyphenyl)-p-methane; and also di(hydroxyphenyl) ether, di(hydroxypheny)thioether, di(hydroxypheny)ketone, and di (hydroxypheny)sulfoxide.

Examples of the above polymer polyol include a polyether polyol such as polyoxyethylene glycol (PEG), polyoxypropylene glycol (PPG) and polyoxytetramethylene glycol (PTMG); a condensed polyester polyol such as polyethylene adipate (PEA), polybutylene adipate (PBA) and polyhexamethylene adipate (PHMA); a lactone polyester polyol such as poly-ε-caprolactone (PCL); a polycarbonate polyol such as polyhexamethylene carbonate; an acryl polyol; and a polybutadiene polyol. These may be used as a mixture of at least two or more of them. Among them, a polyol having a molecular weight of 200 to 10000 is preferable, and polyoxytetramethylene glycol (PTMG) and polybutadiene polyol are more preferable.

Also, the present invention may use an isocyanate group-containing compound as well as a hydroxyl group-containing compound, instead of reacting only the hydroxyl group-containing compound with the telechelic copolymer. This is because the hydroxyl group-containing compound described above can be easily changed to the isocyanate group-containing compound by reacting with a polyisocyanate. Namely, the reason is that if such an isocyanate group-containing compound is used, the embodiment of reacting the isocyanate groups of the isocyanate groups both terminated the telechelic copolymer with hydroxyl groups of the hydroxyl group-containing compound can be easily changed to the embodiment of reacting hydroxyl groups of the hydroxyl groups both terminated telechelic copolymer with an isocyanate group-containing compound.

The ionomer composition of the present invention is a reaction product obtained by reacting the telechelic copolymer with the hydroxyl group-containing compound or the isocyanate group-containing compound, and preferably, at least 10 mole % of said reaction product is neutralized with an inorganic metal. The degree of neutralization of the carboxylic group in said reaction product is preferably 10 mole % or more, more preferably 20 mole % or more, and even more preferably 30 mole % or more. When the degree of neutralization of the carboxylic group is less than 10 mole %, an ionomerization effect becomes small, resulting in insufficient abrasion-resistance and resilience. On the other hand, because of saturation of the ionomerization effect, the degree of neutralization of the carboxylic group is preferably 95 mole % or less, more preferably 90 mole % or less, and even more preferably 80 mole % or less. Additionally, the degree of neutralization of the carboxylic group is a molar ratio of mole number of neutralized carboxylic groups relative to the total mole number of carboxylic groups contained in said reaction product.

The degree of the neutralization is calculated from the amount of the materials fed. It can also be calculated, for example, by the following formula, using the mole number of a unneutralized carboxyl group ([COOH]) of the unsaturated carboxylic acid in the reaction product determined by thermally fusing the reaction product into tetrahydrofuran and titrating with potassium hydroxide having a normal concentration, and the mole number of the neutralized carboxyl group ([COOM]) calculated by metal analysis.

Degree of the neutralization(mole %)=[COOM]/
([COOH]+[COOM])×100

A metal analysis, for example, a monovalent metal such as sodium may be carried out using, for example, 180-80 Type Polarized Zeeman Atomic Absorption Spectrophotometer manufactured by Hitachi, Ltd., and an analysis of a bivalent metal such as zinc may be carried out using, for example, Sequential Type ICP Optical Emission Spectrometer SPS 1100 manufactured by Seiko Instruments Inc.

The above inorganic metal for neutralizing the carboxyl group may be a metal selected from the group consisting of the 1st group to the 17th group, lanthanoids and actinoids of the periodic table.

The preferable inorganic metal can include an alkali metal such as sodium, potassium and lithium; a divalent metal such as magnesium, calcium, zinc, barium and cadmium; a trivalent metal such as aluminum and neodymium; and other metals like tin and zirconium, more preferable are sodium, lithium, zinc and magnesium. The inorganic metals can be used alone, or in a combination of two or more thereof.

The slab hardness of the ionomer composition for the golf ball is preferably 20 or more, more preferably 30 or more, even more preferably 40 or more, and preferably 70 or less, more preferably 65 or less, even more preferably 60 or less in shore D hardness. If the ionomer composition has the slab hardness of less than 20, the ionomer composition may be too soft for the cover, and resulting in the lowered abrasion-resistance and resilience. On the other hand, if the ionomer composition has the slab hardness of more than 70 in shore D hardness, the ionomer composition is too hard, and may result in the crack of the cover, due to the impact of hitting the golf ball with the club.

Next, a production method of the ionomer composition for the golf ball of the present invention will be explained.

The production method of the ionomer composition for the golf ball of the present invention comprises steps of obtaining a reaction product by reacting a telechelic copolymer having functional groups introduced in both terminals of a binary copolymer formed by copolymerizing an olefin monomer having 2 to 8 carbon atoms and an unsaturated carboxylic acid having 2 to 18 carbon atoms, and/or a ternary copolymer formed by copolymerizing an olefin monomer having 2 to 8 carbon atoms, an unsaturated carboxylic acid having 2 to 18 carbon atoms and an unsaturated carboxylic acid ester with a hydroxyl group-containing compound or an isocyanate group-containing compound; and neutralizing the carboxylic group of said telechelic copolymer or the resultant reaction product with an inorganic metal compound.

The reaction of the telechelic copolymer with the hydroxyl group-containing compound or the isocyanate group-containing compound can be suitably selected depending on functional groups introduced into the terminals of the telechelic copolymer. For example, in the case that a functional group introduced into the terminals of the telechelic copolymer is a carboxyl group, typically exemplified is a dehydration condensation reaction of the carboxyl group in said telechelic copolymer and the hydroxyl group in the hydroxyl group-containing compound. In addition, an embodiment where a carboxyl group other than the terminal of the telechelic copolymer is reacted with a hydroxyl group of the hydroxyl group-containing compound is also included in the present invention. The dehydration condensation reaction, for example, can be conducted by heat refluxing in the presence of a concentrated sulfuric acid.

Also, in the case that a functional group introduced into the terminals of the telechelic copolymer is an isocyanate group, it is possible to selectively react the terminal isocyanate group with a hydroxyl group of the hydroxyl group-containing compound. Also, in the case that a hydroxyl group is introduced in the terminals of the telechelic copolymer, the isocyanate group-containing compound is suitably reacted thereto, instead of the hydroxyl group-containing compound, or in addition to the hydroxyl group-containing compound.

The method of ionomerization by neutralizing a carboxyl group include, for example, an embodiment where the carboxyl group of the telechelic copolymer is neutralized beforehand, then the telechelic copolymer is reacted with the hydroxyl group-containing compound or the isocyanate group-containing compound, or an embodiment where the carboxyl group of the reaction product is neutralized after the reaction product is obtained by reacting the telechelic copolymer with the hydroxyl group-containing compound or the isocyanate group-containing compound. In a preferable embodiment, the carboxyl group of the telechelic copolymer is neutralized beforehand, and then the telechelic copolymer is reacted with the hydroxyl group-containing compound or the isocyanate group-containing compound.

The neutralization of the carboxyl group in the telechelic copolymer or the resultant reaction product can be conducted, for example, in a manner where the copolymer is melted, and then a pre-determined amount of the inorganic metal compound is added to the melted copolymer, and kneaded. Specifically, the neutralization can be conducted by melt-mixing the copolymer with an inorganic metal compound at 150 to 300° C. using an extruder. Examples of the inorganic metal compound used include a hydroxide, an oxide, a carbonate (carbonate salt), a hydrogen carbonate (hydrogen carbonate salt), a phosphate (phosphoric acid salt), a sulfate (sulfuric acid salt), and an acetic acid salt of the meal described above, preferably the hydroxide and the oxide thereof.

(2) Golf Ball of the Present Invention

A golf ball of the present invention is not particularly limited as long as it uses the above ionomer composition for the golf ball as the constituent composition of the golf ball. Specific examples of the golf ball of the present invention are as follows.

(A) A one-piece golf ball, wherein the ionomer composition for the golf ball is used as a resin component constituting a golf ball body;

(B) A two-piece golf ball comprising a core and a cover covering said core, wherein the above ionomer composition for the golf ball is used as a resin component constituting said core and/or the cover, more preferably the ionomer composition for the golf ball is used as the resin component constituting the cover;

(C) A three-piece golf ball comprising a core, an intermediate layer covering said core, and a cover covering said intermediate layer, wherein the ionomer composition for the golf ball is used as a resin component constituting at least one of the core, the intermediate layer and the cover, and, more preferably, the ionomer composition for the golf ball is used as the resin component constituting an outermost cover layer;

(D) A multi-piece golf ball having at least four layers, wherein the ionomer composition for the golf ball is used as a resin component constituting at least one of the layers; more preferably, the ionomer composition for the golf ball is used as the resin component constituting an outermost cover layer; and (E) A wound-core golf ball comprising a wound core and a cover covering said wound core, wherein the ionomer composition for the golf ball is used as a resin component constituting said cover; more preferably the ionomer composition for the golf ball is used as the resin component constituting an outermost cover layer.

The ionomer composition for the golf ball of the present invention will be explained below in an embodiment where the ionomer composition is used as a resin component constituting a cover or an intermediate layer, but the present invention is not to be limited to the embodiment. In the case where the cover or the intermediate layer is formed using the ionomer composition for the golf ball of the present invention, as the composition for forming the cover or the intermediate layer (hereinafter, referred to simply as "cover (intermediate layer) composition" in some instances), the composition containing the above ionomer composition as a resin component may be suitably used. The content of the ionomer composition in the resin component of said cover (intermediate layer) composition is preferably 50 parts by mass or more, more preferably 60 parts by mass or more and even more preferably 70 parts by mass or more based on the 100 parts by mass of the resin component. Also, as the resin component of the cover (intermediate layer) composition, using the ionomer composition alone is also a preferable embodiment.

Furthermore, as the resin component of the cover (intermediate layer) composition, other resin component can be used together with the ionomer composition, unless the effect of the present invention is not deteriorated. Examples of the other resin component, in addition to the conventionally known ionomers, include a thermoplastic polyamide elastomer commercially available under a trade name "PEBAX (e.g. PEBAX 2533)" from Arkema Inc., a thermoplastic polyester elastomer commercially available under a trade name "HYTREL (e.g. HYTREL 3548, HYTREL 4047)" from Du Pont-Toray Co. Ltd, a thermoplastic polyurethane elastomer commercially available under a trade name "ERASTOLLAN (e.g. ERASTOLLAN XNY97A)" from BASF POLYURETHANE ELASTOMERS Co., and a thermoplastic polystyrene elastomer commercially available under a trade name "RABALON" from Mitsubishi Chemical Corporation. Examples of the ionomer resin include, in particular, an ionomer resin wherein at least a part of carboxyl groups in a copolymer of ethylene with α,β-unsaturated carboxylic acid having 3 to 8 carbon atoms is neutralized with a metal ion; a part of carboxyl groups in a ternary copolymer formed by copolymerizing ethylene, α,β-unsaturated carboxylic acid having 3 to 8 carbon atoms and α,β-unsaturated carboxylate is neutralized with a metal ion, or a mixture thereof.

Specific examples of the ionomer resin as exemplified in a trade name include, Himilan 1555 (Na), Himilan 1557 (Zn), Himilan 1605 (Na), Himilan 1706 (Zn), Himilan 1707 (Na) and Himilan AM7311 (Mg) commercially available from Du Pont-Mitsui Polychemicals Co. Ltd.; and Himilan 1856 (Na) and Himilan 1855 (Zn) as a ternary copolymer ionomer resin.

Further, examples of an ionomer resin commercially available from Du Pont Corp. include Surlyn 8945 (Na), Surlyn 9945 (Zn), Syrlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li) and Surlyn AD8546 (Li), and examples of a ternary copolymer ionomer resin include Surlyn 8120 (Na), Surlyn 8320 (Na), Surlyn 9320 (Zn) and Surlyn 6320 (Mg).

Also, examples of an ionomer resin commercially available from Exxon Mobil Chemical Co. include Iotek 8000 (Na), Iotek 8030 (Na), Iotek 7010 (Zn) and Iotek 7030 (Zn), and examples of a ternary copolymer ionomer resin include Iotek 7510 (Zn) and Iotek 7520 (Zn).

Additionally, Na, Zn, K, Li and Mg described in parentheses after the trade name of the above ionomer resin indicate the kind of metal of the neutralizing metal ions. The cover (intermediate layer) composition for the golf ball of the present invention may contain, in addition to said ionomer composition for the golf ball, a pigment component such as titanium oxide and blue pigment, a specific gravity adjusting agent such as a calcium carbonate and a barium sulfate, a dispersing agent, an antioxidant, an ultraviolet absorbent, a light stabilizer, a fluorescent material or a fluorescent brightener, to the extent that the desired performance is not damaged.

Also, the thickness of the cover and the intermediate layer using the ionomer composition for the golf ball of the present invention is preferably 0.1 mm or more, more preferably 0.3 mm or more, even more preferably 0.5 mm or more, and preferably 2.0 mm or less, more preferably 1.5 mm or less and even more preferably 1.2 mm or less. In the case that the thickness is less than 0.1 mm, it may be difficult to mold the cover and the intermediate layer in some instances. In the case that the thickness is more than 2.0 mm, the cover and the intermediate layer become too thick, and thus the resilience of the resultant golf ball may decrease in some instances.

As the method for forming the cover or the intermediate layer, for example, the cover or the intermediate layer is molded by covering a core with the cover (intermediate layer) composition. The method for molding the cover or the intermediate layer is not particularly limited, and includes, for example, a method including previously molding the cover (intermediate layer) composition into hemispherical half shells, covering the core with two half shells, and subjecting the core with the two half shells to the pressure molding at the temperature of 130 to 170° C. for 1 to 5 minutes, or a method including injection molding the cover (intermediate layer) composition directly onto the core directly to cover the core.

Also, in preparing the golf ball body by molding the cover, a concavity called dimple is generally formed on the surface. After the formation of a cover, paint finish, stamp and the like may be carried out as required. Further, if necessary, the surface of the golf ball body may be subjected to a grinding treatment like sand blast treatment to enhance the adhesion to a mark or paint film.

The above described embodiments are the case that said ionomer composition is used as the intermediate layer or the cover in a golf ball having a multi-layer structure such as two-piece golf ball, three-piece golf ball and multi-piece golf ball. In the present invention, said ionomer composition may be used as the core of the golf ball having a multi-layer structure or the one piece golf ball body. Generally, as the core of golf ball having a multi-layer structure, a conventional rubber composition for the core can be used. The method of molding said ionomer composition into the core or the golf ball body is not particularly limited, and the injection molding method of the ionomer composition may be employed.

As a conventional rubber composition for the core that can be used as the core of the golf ball having a multilayer structure, for example, without limitation, is preferably a molded body (a rubber core) which is formed by heat-pressing a rubber composition. The rubber composition preferably comprises a base rubber, a co-crosslinking agent, a crosslinking initiator and a filler.

As the above base rubber, a natural rubber and/or a synthetic rubber, for example, a polybutadiene rubber, a natural rubber, a polyisoprene rubber, a styrene-polybutadiene rubber and an ethylene-propylene-diene rubber (EPDM) may be used. Among them, a butadiene rubber, particularly a high cis-polybutadiene, having a cis bond of 40% or more, more preferably 70% or more, even more preferably 90% or more is preferable in view of its superior repulsion property.

As the above crosslinking initiator, an organic peroxide may be preferably used. Examples of the organic peroxide include dicumyl peroxide, 1,1-bis (t-butylperoxy)-3,5-trimethylcyclohexane, 2,5-dimethy-2,5-di (t-butylperoxy)hexane and di-t-butyl peroxide. Among them, dicumyl peroxide is preferably used. The amount of the organic peroxide to be blended is preferably 0.3 parts by mass or more, more preferably 0.4 parts by mass or more, and preferably 5 parts by mass or less, more preferably 3 parts by mass or less relative to 100 parts by mass of the base rubber. If the amount is less than 0.3 parts by mass, the core becomes too soft, which tends to decrease resilience, while if the amount is more than 5 parts by mass, it becomes too hard, which lowers the shot feeling.

As the above co-crosslinking agent, α,β-unsaturated carboxylic acid having 3 to 8 carbon atoms or the metal salt thereof may be used. Examples of the metal constituting the metal salt include zinc, magnesium, calcium, aluminum and sodium, and zinc is preferably used pointing view of increasing resilience. Examples of the preferable α,β-unsaturated carboxylic acid and the metal salt are acrylic acid, methacrylic acid, zinc acrylate and zinc methacrylate.

The amount of the co-crosslinking agent used is 10 parts by mass or more, more preferably 15 parts by mass or more, even more preferably 20 parts by mass or more, and 55 parts by mass or less, more preferably 50 parts by mass or less and even more preferably 48 parts by mass or less relative to 100 parts by mass of the base rubber. When the amount of the co-crosslinking agent used is less than 10 parts by mass, the amount of the organic peroxide used must be increased to provide a suitable hardness, which tends to decrease the resilience. On the other hand, when the amount of the co-crosslinking agent used is more than 55 parts by mass, a core becomes too hard, which may lower the shot feeling.

The above filler may be one conventionally formulated in the core of the golf ball. The filler may include an inorganic salt, specifically, such as a zinc oxide, a barium sulfate and a calcium carbonate, and a high specific gravity metal powder such as a tungsten powder, a molybdenum powder and the mixture thereof. The amount of the filler to be blended is 0.5 parts by mass or more, preferably 1 part by mass or more, and 30 parts by mass or less, preferably 20 parts by mass or less relative to the base rubber of 100 parts by mass. If the amount is less than 0.5 parts by mass, the adjustment of the specific gravity becomes too difficult to obtain an appropriate weight, while if the amount is more than 30 parts by mass, the resilience is lowered because of a small rubber portion occupied in the entire core.

The above rubber composition for the core, may further contain an organic sulfur compound, an antioxidant, or a peptizing agent, in addition to the base rubber, the co-crosslinking agent, the organic peroxide, and the filler.

Examples of the organic sulfur compound are diphenyl disulfide; mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, and bis(4-cyanophenyl)disulfide; di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl) disulfide, bis(2-chloro-5-bromophenyl)disulfide, and bis(2-cyano-5-bromophenyl)disulfide; tri-substituted diphenyl disulfides such as bis(2,4,6-trichlorophenyl)disulfide and bis(2-cyano-4-chloro-6-bromophenyl)disulfide; tetra-substituted diphenyl disulfide such as bis(2,3,5,6-tetrachlorophenyl)disulfide; and penta-substituted diphenyl disulfide such as bis(2,3,4,5,6-pentachlorophenyl)disulfide and bis(2,3,4,5,6-pentabromophenyl)disulfide. These diphenyl disulfide derivatives have some sort of effect on the crosslinking state of the vulcanized rubber and thus enhance the resilience. Among them, diphenyl disulfide and bis(pentabromophenyl) disulfide are particularly preferable, because the golf ball having the very high resilience is obtained.

The amount of the antioxidant added is preferably 0.1 parts by mass or more, and 1 part by mass or less relative to 100 parts by mass of the base rubber. Also, the amount of the peptizing agent is preferably 0.1 parts by mass or more, and 5 parts by mass or less relative to the base rubber of 100 parts by mass.

The core is formed by kneading the above rubber composition and press-molding it into the spherical body in the mold. The conditions for the press-molding should be determined depending on the rubber composition. The press-molding is preferably carried out for 10 to 40 minutes at the temperature of 130 to 180° C. under the pressure of 2.9 MPa to 11.8 MPa.

The core preferably has a diameter of 30 mm or more, more preferably 32 mm or more, and preferably has a diameter of 41 mm or less, more preferably 40.5 mm or less. If the diameter of the core is less than 30 mm, the thickness of the intermediate layer and the cover becomes thicker than the desired thickness and thus the resilience may be lowered. On the other hand, if the diameter of the core is larger than 41 mm, the thickness of the intermediate layer and the cover becomes thinner than the desired thickness and thus the intermediate layer or the cover may not function well.

In the case that the core has a diameter of 30 mm to 41 mm, the core preferably has a compression deformation amount (an amount shrinks along the direction of the compression) of 2.5 mm or more, more preferably 3.0 mm or more and preferably has a compression deformation amount of 5.0 mm or less, more preferably 4.5 mm or less when applying a load from 98 N as an initial load to 1275 N as a final load. If the compression deformation amount is less than 2.5 mm, the shot feeling may become bad due to the hardness, while if the compression deformation amount is larger than 5.0 mm, the resilience may become low.

The golf ball of the present invention, when it has a diameter of 42.60 mm to 42.90 mm and when applying a load from an initial load of 98N to a final load of 1275N, has an amount of compression deformation (amount of golf ball compressed in the direction of compression) of 2.0 mm or more, more preferably 2.1 mm or more, even more preferably 2.2 mm or more, and 4.5 mm or less, more preferably 4.0 mm or less, further preferably 3.5 mm or less. When the amount of compression deformation is less than 2.0 mm, the shot feeling becomes hard and bad, while when the amount exceeds 4.5 mm, there are some instances that resilience is lowered.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Methods]

(1) Slab Hardness (Shore D Hardness)

The ionomer composition and the cover (intermediate layer) composition were each formed into sheets each having a thickness of about 2 mm by hot press molding and the resulting sheets were maintained at 23° C. for two weeks. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD.

(2) Abrasion-Resistance

A commercially available pitching wedge was attached to a swing robot available from Golf laboratory Co., and two points of a ball respectively were hit once at the head speed of 36 m/sec. to observe the areas which were hit. Abrasion-resistance was evaluated and ranked into three levels based on following criteria.

[Evaluation Criteria]

G(Good): Slight scratches were present on the surface of the golf ball, but almost no care.

F(Fair): Scratches were clearly left on the surface of the golf ball, and a little scuffing could be observed.

P(Poor): The surface of the golf ball was abraded considerably, and scuffing was conspicuous.

(3) Amount of Compression Deformation (mm)

An amount of deformation in the compression direction (amount of golf ball compressed in the direction of compression) was measured in each of golf balls or cores when applying from an initial load of 98N to a final load of 1275N.

(4) Repulsion Coefficient of Golf Ball

Aluminum cylinder having a weight of 200 g was collided with the resultant golf ball at the speed of 45 m/sec. to measure the speed of the cylinder and the golf ball before and after the collision. The repulsion coefficient of each golf ball was obtained based on each of the measured speed and weight. Each golf ball was measured 5 times to obtain the average. The repulsion coefficient measured in terms of each golf ball is reduced to an index number relative to the measured value obtained in Golf ball No. 10 whose repulsion coefficient is assumed 100. The higher value of repulsion index indicates higher resilience.

(5) Shot Feeling

The hitting test using a metal head driver W#1 was conducted by 10 golfers (two professionals, eight advanced amateurs having a handicap of 5 or less). Resilient feel of the impact when hitting the golf ball was evaluated in the following criteria, and the result largest in number was defined as the shot feeling of the golf ball.

G(good): Good resilient feel

F(fair): Average

P(poor): Heavy feel and weak resilient feel

[Synthesis of Ionomer Composition]

(1) To a stirring autoclave type continuous reactor of 1.5 liters in internal volume were loaded a monomer mixture of ethylene and methacrylic acid (ethylene: methacrylic acid=80:10 by mass) and 2,2'-azobis[N-(2-carboxyethyl)-2-methylpropionamidine]hydrate (V-057 available from Wako Pure Chemical Ltd.) as a radical polymerization initiator of 4 ppm by mass relative to the monomer mixture, and the reaction was carried out at 160° C. while keeping a pressure in the reactor at 1600 kg/cm$^2$. The resultant copolymer and unreacted monomer were discharged into a separation container through an adjusting valve, followed by separation of the copolymer to give a copolymer in which carboxyl groups were introduced at both terminals. The resultant ethylene-methacrylic acid copolymer having both terminated carboxyl group of 90 parts by mass and 1,4-butanediol of 10 parts by mass were dissolved in toluene, and concentrated sulfuric acid was added thereto as a catalyst, and heated to reflux to conduct the dehydration condensation reaction between the ethylene-methacrylic acid copolymer having both terminated carboxyl group and 1,4-butadiol. Then toluene was distilled out with an evaporator, and sodium hydroxide was blended so as to neutralize 50 mole % of the carboxyl group in the resultant reaction product, and extruded by a twin-screw kneading extruder to give the ionomer composition 1.

(2) The ionomer composition 2 was produced in the same manner as in the ionomer composition 1 except that zinc hydroxide was used to neutralize 70 mole % of carboxyl group in the resultant reaction product instead of sodium hydroxide.

(3) The ionomer composition 3 was produced in the same manner as in the ionomer composition 1 except that a monomer mixture of ethylene and methacrylic acid (ethylene: methacrylic acid=70:10 by mass) was used as a monomer mixture, and that using the resultant ethylene-methacrylic acid copolymer of 80 parts by mass and polyoxytetramethylene glycol (molecular weight of 1000) of 20 parts by mass as the hydroxyl group-containing compound to carry out the dehydration condensation reaction.

(4) The ionomer composition 4 was produced in the same manner as in the ionomer composition 3 except that zinc hydroxide was used to neutralize 70 mole % of carboxyl group in the resultant reaction product instead of sodium hydroxide.

(5) The ionomer composition 5 was produced in the same manner as in the ionomer composition 1 except that a monomer mixture of ethylene and methacrylic acid (ethylene: methacrylic acid=66:9 by mass) was used as a monomer mixture, and that using the resultant ethylene-methacrylic acid copolymer of 75 parts by mass and polyoxytetramethylene glycol (molecular weight of 3000) of 25 parts by mass as a hydroxyl group-containing compound to carry out the dehydration condensation reaction.

(6) The ionomer composition 6 was produced in the same manner as in the ionomer composition 5 except that zinc hydroxide was used to neutralize 70 mole % of carboxyl group in the resultant reaction product instead of sodium hydroxide.

(7) To a stirring autoclave type continuous reactor of 1.5 liters in internal volume were loaded a monomer mixture of ethylene and methacrylic acid (ethylene: methacrylic acid=80:10 by mass) and 2,2'-azobis[2-methyl-N-(2-hydroxyethyl)propionamide] (VA-086 manufactured by Wako Pure Chemical Ltd.) as a radical polymerization initiator of 4 ppm by mass relative to the monomer mixture, and reaction was carried out at 160° C. while keeping a pressure in the reactor at 1600 kg/cm$^2$. The resultant copolymer and unreacted monomer were discharged into a separation container through an adjusting valve, followed by separating the copolymer to give a copolymer in which hydroxyl groups were introduced in both terminals (weight average molecular weight of 80000, OH value of 5 mg KOH/g). Sodium hydroxide was blended to neutralize 50 mole % of the carboxyl group of the copolymer, extruded using a twin-screw kneading extruder at 140° C. to give the telechelic copolymer ionomer. The telechelic copolymer ionomer and 4,4'-diphenylmethane diisocyanate (MDI) as a polyisocyanate were blended so that NCO/OH (mole ratio)=1.1, reacted in toluene at 60° C., then toluene was distilled out with an evaporator to give an ethylene-methacrylic acid copolymer ionomer having isocyanate groups introduced in both terminals (content of isocyanate group of 0.4%). Sequentially, the resultant ethylene methacrylic acid copolymer ionomer having terminal isocyanate groups and polyoxytetramethlene glycol (molecular weight of 1000) as the hydroxyl group-containing compound were reacted so that NCO/OH (mole ratio)=1.0 to give ionomer composition 7.

(8) Ionomer composition 8 was produced in the same manner as in the ionomer composition 7 except that zinc hydroxide was used to neutralize 70 mole % of the carboxyl group, instead of sodium hydroxide.

[Production of the Golf Ball]

(1) Production of the Core

The rubber composition shown in Table 1 was kneaded, and pressed in upper and lower molds each having a spherical cavity at the heating condition of 170° C. for 20 minutes to obtain the solid core in a spherical shape.

TABLE 1

| Core composition | A | B |
| --- | --- | --- |
| Polybutadiene rubber | 100 | 100 |
| Zinc acrylate | 29 | 28 |
| Zinc oxide | 5 | 5 |
| Barium sulfate | appropriate amount | appropriate amount* |
| Pentabromo disulfide | 0.5 | 0.5 |
| Dicumyl peroxide | 0.9 | 0.7 |
| Core diameter (mm) | 39.5 | 37.4 |
| Compression deformation amount of core (mm) | 3.2 | 3.5 |

Formulation: parts
*Adjustment for a golf ball to weigh 45.4 g according to the composition of cover
Notes on Table 1
Polybutadiene rubber: BR-18 (high-cis polybutadiene) available from JSR Corporation
Zinc acrylate: ZNDA-90S available from Nihon Jyoryu Co. Ltd.
Zinc oxide: Ginrei R available from Toho Zinc Co. Ltd.
Barium sulfate: Barium sulfate BD available from Sakai Chemical Industry Co. Ltd.
Dicumyl peroxide: Percumyl D available from NOF Corporation
The amount of barium sulfate was appropriately adjusted to obtain the golf ball having a mass of 45.4 g.

(2) Preparation of the Cover (Intermediate Layer) Composition

The materials shown in Table 2 were mixed using a twin-screw kneading extruder to obtain the cover (intermediate layer) composition in the form of pellet as shown in Table 3. The extrusion was conducted in the following conditions:

screw diameter=45 mm, screw revolutions=200 rpm, screw L/D=35, and the cover (intermediate layer) composition was heated to from 160° C. to 230° C. at the die position of the extruder.

Erastollan XNY97A: a thermoplastic urethane elastomer manufactured by BASF Japan Ltd.

(3) Production of the Golf Ball Body

The cover (intermediate layer) composition obtained as described above was injection molded onto the core obtained as described above to form the intermediate layer covering said core and/or the cover. The upper and lower molds for forming the cover have a spherical cavity having dimples. The part of the dimples can serve as a hold pin which is retractable. When forming the golf ball body, the hold pins were protruded to hold the core, and the resin heated at 210° C. was charged into the mold held under the pressure of 80 tons for 0.3 second. After the cooling for 30 seconds, the molds were opened and then the golf ball body was discharged. The surface of the resultant golf ball was subjected to a sand blast

TABLE 2

| Composition | Monomer composition (mass ratio) | | | Neutralizing metal | Degree of neutralization (mol %) | Shore D hardness |
|---|---|---|---|---|---|---|
| Ionomer composition 1 | Ethylene (80) | Methacrylic acid (10) | 1,4-butanediol (10) | Na | 50 | 54 |
| Ionomer composition 2 | Ethylene (80) | Methacrylic acid (10) | 1,4-butanediol (10) | Zn | 70 | 54 |
| Ionomer composition 3 | Ethylene (70) | Methacrylic acid (10) | PTMG-1000 (20) | Na | 50 | 45 |
| Ionomer composition 4 | Ethylene (70) | Methacrylic acid (10) | PTMG-1000 (20) | Zn | 70 | 45 |
| Ionomer composition 5 | Ethylene (66) | Methacrylic acid (9) | PTMG-3000 (25) | Na | 50 | 34 |
| Ionomer composition 6 | Ethylene (66) | Methacrylic acid (9) | PTMG-3000 (25) | Zn | 70 | 34 |
| Ionomer composition 7 | Ethylene (70) | Methacrylic acid (10) | PTMG-1000 | Na | 50 | 44 |
| Ionomer composition 8 | Ethylene (70) | Methacrylic acid (10) | PTMG-1000 | Zn | 70 | 44 |
| Himilan 1605 | Ethylene | Methacrylic acid | — | Na | — | 65 |
| Himilan AM7329 | Ethylene | Methacrylic acid | — | Zn | — | 65 |
| Himilan 1856 | Ethylene | Methacrylic acid | Acrylic acid ester | Na | — | 52 |
| Himilan 1855 | Ethylene | Methacrylic acid | Acrylic acid ester | Zn | — | 54 |
| Surlyn 8320 | Ethylene | Methacrylic acid | Acrylic acid ester | Na | — | 36 |
| Himilan AM7316 | Ethylene | Methacrylic acid | Acrylic acid ester | Zn | — | 34 |
| ELASTOLLAN XNY97A | Thermoplastic urethane | | | — | — | 48 |

TABLE 3

| Cover (intermediate layer) composition | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Materials | | | | | | | | | | | | | | |
| Ionomer composition 1 | 50 | — | — | — | — | — | 50 | — | — | — | — | — | — | — |
| Ionomer composition 2 | 50 | — | — | — | — | 50 | — | — | — | — | — | — | — | — |
| Ionomer composition 3 | — | 50 | 80 | 20 | — | — | — | — | — | — | — | — | — | — |
| Ionomer composition 4 | — | 50 | 20 | 80 | — | — | — | — | — | — | — | — | — | — |
| Ionomer composition 5 | — | — | — | — | 50 | — | — | — | — | — | — | — | — | — |
| Ionomer composition 6 | — | — | — | — | 50 | — | — | — | — | — | — | — | — | — |
| Ionomer composition 7 | — | — | — | — | — | — | — | — | — | — | — | — | — | 50 |
| Ionomer composition 8 | — | — | — | — | — | — | — | — | — | — | — | — | — | 50 |
| Himilan 1605 | — | — | — | — | — | 50 | — | — | — | 50 | — | 50 | — | — |
| Himilan AM7329 | — | — | — | — | — | — | 50 | — | — | — | — | 50 | — | — |
| Himilan 1856 | — | — | — | — | — | — | — | 50 | — | — | — | — | — | — |
| Himilan 1855 | — | — | — | — | — | — | — | 50 | 60 | — | 50 | — | — | — |
| Surlyn 8320 | — | — | — | — | — | — | — | — | 40 | 50 | — | — | — | — |
| Himilan AM7316 | — | — | — | — | — | — | — | — | — | — | 50 | — | — | — |
| ELASTOLLAN XNY97A | — | — | — | — | — | — | — | — | — | — | — | — | 100 | — | — |
| Titanium oxide | 2 | 2 | 2 | 2 | 2 | 2 | 2 | 2 | 2 | 2 | 2 | 2 | 2 | 2 |
| Slab hardness (Shore D) | 57 | 48 | 47 | 46 | 36 | 62 | 61 | 56 | 48 | 36 | 62 | 48 | 66 | 46 |

Notes on Table 3

Himilan: an ionomer resin manufactured by Du Pont-Mitsui Polychemicals Co. Ltd.

Surlyn: an ionomer resin manufactured by Du Pont Corporation treatment, and marking, and then applied with a clear paint thereto, the paint was dried in an oven at 40° C. to give a golf ball having a diameter of 42.7 mm and a mass of 45.4 g.

The evaluation results of the golf balls obtained are shown in Table 4 regarding the composition of golf ball, abrasion-resistance, flight distance, shot feeling and amount of spin.

TABLE 4

| | Golf ball No. | | | | | | | | | | | | | | |
|---|---|---|---|---|---|---|---|---|---|---|---|---|---|---|---|
| | No. 1 | No. 2 | No. 3 | No. 4 | No. 5 | No. 6 | No. 7 | No. 8 | No. 9 | No. 10 | No. 11 | No. 12 | No. 13 | No. 14 | No. 15 |
| Type of core | A | B | A | A | A | A | A | A | A | A | A | A | A | A | A |
| Intermediate layer composition | — | 13 | — | — | — | — | — | — | — | — | — | — | — | — | — |
| Thickness of inermediate layer (mm) | — | 1.5 | — | — | — | — | — | — | — | — | — | — | — | — | — |
| Cover composition | 1 | 1 | 2 | 3 | 4 | 5 | 6 | 7 | 8 | 9 | 10 | 11 | 12 | 13 | 14 |
| Thickness of cover (mm) | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Compression deformation amount of core (mm) | 2.9 | 2.7 | 3.0 | 3.0 | 3.0 | 3.1 | 2.7 | 2.7 | 2.9 | 3.0 | 3.1 | 2.7 | 3.1 | 2.5 | 3 |
| Resilience index | 102 | 103 | 101 | 101 | 101 | 100 | 103 | 103 | 101 | 100 | 99 | 101 | 98 | 103 | 101 |
| Shot feeling | G | G | G | G | G | G | G | G | F | F | F | G | F | F | G |
| Abrasion-resistance | G | G | G | G | G | G | G | G | P | P | P | F | G | F | G |

In Table 4, golf balls of No. 1 to No. 8, and No. 15 are the case that the cover was produced using the ionomer composition comprising a reaction product obtained by reacting the telechelic copolymer having a functional group introduced into both terminals of the binary copolymer formed by copolymerizing the olefin monomer having 2 to 8 carbon atoms and the unsaturated carboxylic acid having 2 to 18 carbon atoms with the hydroxyl group-containing compound, wherein at least 10% of the carboxylic group in said reaction product is neutralized with an inorganic metal. All of the golf balls were excellent in balance of flight distance (resilience), abrasion-resistance and shot feeling. Golf balls No. 9 to No. 12 and No. 14 are the case that mixtures of the conventional ionomer resins were used. All of them had poor abrasion-resistance, and the shot feeling was bad in golf balls No. 9 to No. 11. Also, in golf ball No. 13 an urethane cover was used, where the coefficient of resilience and shot feeling were both lowered.

The present invention can provide a golf ball having well-balanced flight distance (resilience), abrasion-resistance and shot feeling. The ionomer composition of the present invention is preferable particularly for a golf ball cover.

This application is based on Japanese Patent application No. 2006-002923 filed on Jan. 10, 2006, the contents of which are hereby incorporated by reference.

What is claimed is:

1. An ionomer composition for a golf ball comprising a reaction product obtained by reacting a telechelic copolymer having functional groups introduced in both terminals of a binary copolymer formed by copolymerizing an olefin monomer having 2 to 8 carbon atoms and an unsaturated carboxylic acid having 2 to 18 carbon atoms, and/or a ternary copolymer formed by copolymerizing an olefin monomer having 2 to 8 carbon atoms, an unsaturated carboxylic acid having 2 to 18 carbon atoms and an unsaturated carboxylic acid ester with a hydroxyl group-containing compound or an isocyanate group-containing compound, wherein at least 10 mole % of a carboxylic group in said reaction product is neutralized with an inorganic metal.

2. The ionomer composition for the golf ball according to claim 1, wherein the terminal group of said telechelic copolymer is at least one member selected from the group consisting of a carboxylic group, a hydroxyl group, an amino group, an isocyanate group, halogen, a nitro group, a thiol group and an epoxy group.

3. The ionomer composition for the golf ball according to claim 1, wherein said hydroxyl group-containing compound is a polyol having a molecular weight of 200 to 10000.

4. The ionomer composition for the golf ball according to claim 3, wherein said hydroxyl group-containing compound is polyoxytetramethylene glycol (PTMG) having a molecular weight of 1000 to 3000.

5. The ionomer composition for the golf ball according to claim 1, wherein the reaction product is obtained by a dehydration condensation reaction between the carboxyl group of said telechelic copolymer and the hydroxyl group of the hydroxyl group-containing compound.

6. The ionomer composition for the golf ball according to claim 1, wherein the telechelic copolymer is the binary copolymer of ethylene and methacrylic acid, or the ternary copolymer of ethylene, methacrylic acid, and an acrylic acid ester.

7. The ionomer composition for the golf ball according to claim 1, content of the olefin monomer in the binary or ternary copolymer is from 50% to 80% by mass.

8. The ionomer composition for the golf ball according to claim 1, content of the unsaturated carboxylic acid in the ternary copolymer is from 8% to 30% by mass.

9. The ionomer composition for the golf ball according to claim 1, wherein a degree of neutralization of the carboxylic group in the reaction product is from 30 mole % to 80 mole %.

10. The ionomer composition for the golf ball according to claim 1, wherein the inorganic metal is an alkali metal.

11. A production method of an ionomer composition for a golf ball, comprising the steps of:
    obtaining a reaction product by reacting a telechelic copolymer having functional groups introduced in both terminals of a binary copolymer formed by copolymerizing an olefin monomer having 2 to 8 carbon atoms and an unsaturated carboxylic acid having 2 to 18 carbon atoms, and/or a ternary copolymer formed by copolymerizing an olefin monomer having 2 to 8 carbon atoms, an unsaturated carboxylic acid having 2 to 18 carbon atoms and an unsaturated carboxylic acid ester with a hydroxyl group-containing compound or an isocyanate group-containing compound; and
    neutralizing the carboxylic group of said telechelic copolymer or the resultant reaction product with an inorganic metal compound.

12. The production method of the ionomer composition for the golf ball according to claim 11, carrying out a dehydration condensation reaction between the carboxylic group of said telechelic copolymer and the hydroxyl group of the hydroxyl group-containing compound.

13. The production method of the ionomer composition for the golf ball according to claim 11, wherein an isocyanate group is introduced as the terminal functional group of said telechelic copolymer, and the terminal isocyanate group of said telechelic copolymer is reacted with the hydroxyl group of said hydroxyl group-containing compound.

14. The production method of the ionomer composition for the golf ball according to claim 11, wherein the telechelic copolymer is neutralized beforehand, then the telechelic copolymer is reacted with the hydroxyl group-containing compound or the isocyanate group-containing compound.

15. The production method of the ionomer composition for the golf ball according to claim 11, wherein the carboxyl group of the reaction product is neutralized after the reaction product is obtained by reacting the telechelic copolymer with the hydroxyl group-containing compound or the isocyanate group-containing compound.

16. A one-piece golf ball, wherein the ionomer composition for the golf ball of claim 1 is used as a resin component constituting a golf ball body.

17. A two-piece golf ball comprising
a core, and
a cover covering said core,
wherein the ionomer composition for the golf ball of claim 1 is used as a resin component constituting said core and/or the cover.

18. A three-piece golf ball comprising
a core,
an intermediate layer covering said core, and
a cover covering said intermediate layer,
wherein the ionomer composition for the golf ball of claim 1 is used as a resin component constituting at least one of the core, the intermediate layer and the cover.

19. A multi-piece golf ball having at least four layers, wherein the ionomer composition for the golf ball of claim 1 is used as a resin component constituting at least one layer thereof.

* * * * *